United States Patent
Frenzel et al.

(10) Patent No.: US 11,254,295 B2
(45) Date of Patent: Feb. 22, 2022

(54) AUTOMATIC BRAKING DEVICE FOR A VEHICLE AND METHOD FOR AUTOMATICALLY BRAKING A VEHICLE

(71) Applicant: Robert Bosch GmbH, Stuttgart (DE)

(72) Inventors: Toni Frenzel, Yokohama-Yokohama (JP); Dennis Moeller, Pleidelsheim (DE); Dieter Blattert, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 16/755,764

(22) PCT Filed: Sep. 12, 2018

(86) PCT No.: PCT/EP2018/074675
§ 371 (c)(1),
(2) Date: Apr. 13, 2020

(87) PCT Pub. No.: WO2019/076547
PCT Pub. Date: Apr. 25, 2019

(65) Prior Publication Data
US 2021/0370902 A1    Dec. 2, 2021

(30) Foreign Application Priority Data
Oct. 19, 2017  (DE) .................... 10 2017 218 660.7

(51) Int. Cl.
*B60T 13/74* (2006.01)
*B60T 7/12* (2006.01)

(52) U.S. Cl.
CPC .............. *B60T 13/748* (2013.01); *B60T 7/12* (2013.01); *B60T 2270/604* (2013.01)

(58) Field of Classification Search
CPC ..... B60T 7/12; B60T 13/748; B60T 2270/604
See application file for complete search history.

(56) References Cited

U.S. PATENT DOCUMENTS

| 7,957,861 B2 * | 6/2011 | McAndrew, III | F01N 11/00 701/34.2 |
| 8,180,509 B2 * | 5/2012 | Grider | B60W 10/06 701/22 |

(Continued)

FOREIGN PATENT DOCUMENTS

| CN | 202429190 U | 9/2012 |
| CN | 203472824 U | 3/2014 |

(Continued)

OTHER PUBLICATIONS

International Search Report for PCT/EP2018/074675, dated Dec. 20, 2018.

*Primary Examiner* — Pamela Rodriguez
(74) *Attorney, Agent, or Firm* — Norton Rose Fulbright US LLP; Gerard A. Messina

(57) ABSTRACT

An automatic braking device for a vehicle and a method for automatically braking a vehicle. The vehicle is automatically braked using at least one friction brake of the vehicle in such a way that a brake force that is effectuated by the at least one friction brake is increased, at least at times, with a predefined maximum brake force buildup gradient and/or up to a predefined maximum brake force. At least when no emergency braking situation is present, it is ascertained prior to the automatic braking whether the vehicle at that moment is traveling through a specified or self-determined particulate matter protection area, and, if necessary, the brake force that is effectuated with the aid of the at least one friction brake is increased at most with a predefined or set limiting brake force buildup gradient and/or at most up to a predefined or set limiting brake force.

10 Claims, 1 Drawing Sheet

(56) References Cited

U.S. PATENT DOCUMENTS

| | | | |
|---|---|---|---|
| 2009/0240388 A1 | 9/2009 | Harris | |
| 2014/0262633 A1 | 9/2014 | Kunzler et al. | |
| 2017/0066435 A1 | 3/2017 | Morisaki et al. | |
| 2017/0129467 A1* | 5/2017 | Karlsson | B60W 30/143 |

FOREIGN PATENT DOCUMENTS

| | | | |
|---|---|---|---|
| CN | 104583030 A | | 4/2015 |
| CN | 104973039 A | | 10/2015 |
| DE | 102014209520 A1 | | 11/2015 |
| DE | 2613983 B1 | * | 3/2017 |
| JP | 2004042890 A | | 2/2004 |
| JP | 2014172556 A | | 9/2014 |
| JP | 2017520452 A | | 7/2017 |
| WO | 2016002276 A1 | | 1/2016 |

* cited by examiner

AUTOMATIC BRAKING DEVICE FOR A VEHICLE AND METHOD FOR AUTOMATICALLY BRAKING A VEHICLE

FIELD

The present invention relates to an automatic braking device for a vehicle and an automatic speed control system for a vehicle. Moreover, the present invention relates to a method for automatically braking a vehicle and a method for automatically controlling a speed of a vehicle.

BACKGROUND INFORMATION

Automatic speed control systems for vehicles are conventional in the related art. Thus, for example, German Patent Application No. DE 10 2014 209 520 A1 describes an automatic distance control system for a vehicle, in which at least one other vehicle that is traveling in the same lane as the host vehicle or in a lane that is different from the lane of the host vehicle is detected. Lastly, it is automatically determined whether a predefined minimum distance can be maintained by slowing down the vehicle with a deceleration that is less than or equal to a predefined maximum deceleration value.

SUMMARY

The present invention provides an automatic braking device for a vehicle, an automatic speed control system for a vehicle, a method for automatically braking a vehicle, and a method for automatically controlling a speed of a vehicle.

The present invention provides options for reducing or preventing particulate emissions during travel of a vehicle through an area for which a driving mode that is optimized for particulate emissions is desired. In this way, particulate emissions may be prevented/reduced in a targeted manner in those areas in which high particulate values would be harmful to a large number of people. The present invention thus makes a significant contribution to reducing/eliminating particulate pollution.

The present invention may be used in all products that include an assisted or automated braking function or an assisted or automated driving function by at least temporarily carrying out an automatic reduction of a vehicle speed. For all of these products, the present invention results in a surroundings- and/or situation-dependent driving mode of the vehicle used, with the aid of which particulate emissions may be reduced or prevented in a targeted manner in those areas in which a driving mode that is optimized for particulate emissions is desired. It is also noted that the present invention may even be applied to highly automated driving maneuvers to ensure the advantages described above.

In one preferred specific embodiment of the automatic braking device according to the present invention, the electronic device is additionally designed to determine, taking into account at least one sensor signal of at least one surroundings detection sensor and/or at least one vehicle state detection sensor, whether an emergency braking situation is present, and if necessary, even if the vehicle at that moment is traveling through a particulate matter protection area that is specified for the electronic device, to control the at least one braking system component in such a way that the brake force that is effectuated on the at least one associated wheel with the aid of the at least one friction brake is increased by the maximum brake force buildup gradient and/or to the maximum brake force.

Thus, despite the driving mode of the vehicle, optimized for particulate emissions, that is effectuated under normal conditions, the vehicle may be quickly brought to a standstill in emergency braking situations. The vehicle that is equipped with the automatic braking device thus continues to have a high safety standard.

In another advantageous specific embodiment of the automatic braking device according to the present invention, the electronic device is additionally designed to set the limiting brake force buildup gradient and/or the limiting brake force, taking into account at least one temperature of at least one friction component that is used to effectuate the automatic braking of the vehicle. For example, the limiting brake force buildup gradient and/or the limiting brake force may be set, taking an instantaneous brake disk temperature and/or an instantaneous brake lining temperature into account. The specific embodiment of the automatic braking device described here thus takes into account that emissions of particulate matter during braking that is effectuated with the aid of at least one friction brake are a function not only of the brake force buildup gradient and the brake force, but also of the instantaneous brake disk temperature and the instantaneous brake lining temperature. Thus, with the aid of the specific embodiment of the automated braking device described here, automatic braking of the vehicle may be carried out in such a way that, despite reduced/prevented particulate emissions, the vehicle may be preferably quickly decelerated or brought to a standstill. Thus, good braking and driving comfort is maintained for a driver of the vehicle equipped with the automated braking device.

In addition, if the vehicle at that moment is traveling through a particulate matter protection area that is specified for the electronic device and at least no emergency braking situation is present, the electronic device may be additionally designed to ascertain the maximum generator brake force that is achievable with the aid of a generator of the vehicle. In this case, at least if the vehicle is brakable within a predefined or set maximum time interval with the aid of the maximum generator brake force, the electronic device is preferably designed to control a generator control device, as the at least one braking system component, in such a way that the vehicle is braked with the aid of the generator. The specific embodiment of the automatic braking device described here thus takes into account that braking of the vehicle with the aid of the generator is generally less critical for particulate emissions than is braking of the vehicle with the aid of the at least one friction brake. Due to the preferred use of the generator for braking the vehicle, it is thus possible to additionally reduce/prevent particulate emissions.

The advantages described above are also achieved by an automatic speed control system for a vehicle that includes such an automatic braking device. It is expressly pointed out that the automatic speed control system may be designed with all features of the above-described specific embodiments of the automated braking device.

The advantages described above are likewise ensured when a corresponding method according to the present invention for automatically braking a vehicle is carried out. In addition, the method for automatically braking a vehicle may be refined according to the above-described specific embodiments of the automatic braking device.

Furthermore, a corresponding method in accordance with the present invention for automatically controlling a speed of a vehicle also provides the features described above. The method for automatically controlling a speed of a vehicle may likewise be refined according to the above-described specific embodiments of the automatic braking device.

BRIEF DESCRIPTION OF THE DRAWINGS

Further features and advantages of the present invention are explained below with reference to the figures.

DETAILED DESCRIPTION OF EXAMPLE EMBODIMENTS

Figure 1:
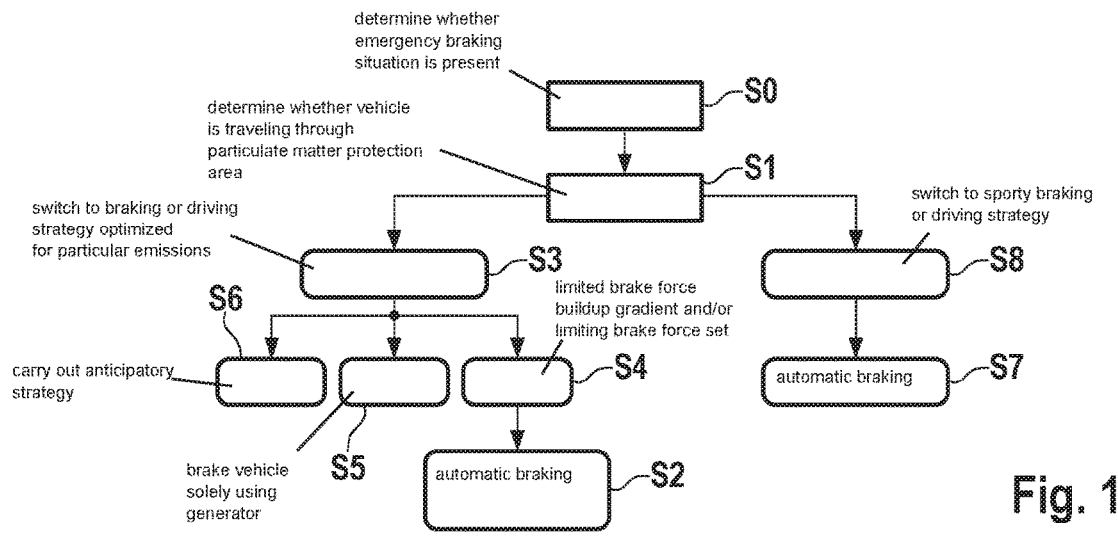
FIG. 1 shows a flow chart of one specific embodiment of the example method for automatically braking a vehicle according to the present invention.

FIG. 1 shows a flow chart of one specific embodiment of the method for automatically braking a vehicle.

In the method for automatically braking a vehicle/motor vehicle described below, practicability is not limited to a specific type of vehicle/motor vehicle. The automatic braking of the vehicle may be understood to mean automatically slowing down the vehicle (to a residual speed not equal to zero) as well as automatically stopping the vehicle (to a standstill). The particular braking of the vehicle takes place automatically, i.e., without a braking request by a driver of the vehicle. Such automatic braking of the vehicle may thus also be referred to as externally induced braking, "driverless" braking, braking without a driver braking input, or external force braking. The automatic braking of the vehicle generally takes place as a response to at least one sensor signal of at least one surroundings detection sensor and/or at least one vehicle state detection sensor. For example, based on the at least one sensor signal it is recognized that slowing down or stopping the vehicle is advantageous/necessary in order to maintain a safety distance from at least one recognized person and/or at least one identified object (such as at least one other vehicle) and/or to reduce the risk of an accident. It is expressly pointed out that practicability of the method described here is not limited to either a certain type of sensor of the at least one surroundings detection sensor and/or of at least one vehicle state detection sensor, or to a particular evaluation program for evaluating the at least one sensor signal.

The automatic braking of the vehicle takes place with the aid of at least one friction brake of the vehicle in such a way that the vehicle is braked with the aid of a brake force that is effectuated on at least one associated wheel of the vehicle by the at least one friction brake. A maximum brake force buildup gradient and/or a maximum brake force are/is specified by technical means or by programming in such a way that, at least at times, the brake force that is effectuated on the at least one associated wheel with the aid of the at least one friction brake is increased with the predefined maximum brake force buildup gradient and/or up to the predefined maximum brake force. (Normally, the brake force that is effectuated by technical means or by programming cannot be increased by a brake force buildup gradient above the predefined maximum brake force buildup gradient or above the predefined maximum brake force.)

The method includes a method step S1 in which it is ascertained whether the vehicle at that moment is traveling through a predefined or self-determined particulate matter protection area. The particulate matter protection area does not have to mean a statutorily stipulated particulate matter protection area. Instead, prior to carrying out the method described here, a self-selected number of areas for which low particulate emissions are desirable are established as a particulate matter protection area. A particulate matter protection area may be, for example, an environmental zone, an urban area, and/or a city center. A rural area and/or a highway (such as an expressway), for example, may be specified as a nonprotected area for particulate matter. Likewise, at least one feature/criterion may be selected/set which differentiates a particulate matter protection area from a nonprotected area for particulate matter. In particular an allowable maximum speed may be evaluated for differentiating between a particulate matter protection area and a nonprotected area for particulate matter. If the allowable maximum speed in an area is below a predefined or self-determined limiting speed, it may be assumed to be highly likely that low particulate emissions are desirable in this area, while an allowable maximum speed above the predefined or self-determined limiting speed indicates that a nonprotected area for particulate matter is being driven through. Thus, with the aid of traffic sign recognition, for example, a distinction may be reliably made between a particulate matter protection area and a nonprotected area for particulate matter. It is expressly pointed out that method step S1 may be carried out in an automated and independent manner, i.e., without assistance from the driver.

A method step S0 may optionally also be carried out prior to the automatic braking. Method step S0 may be carried out before, after, or overlapping in time with method step S1. It is determined in method step S0, taking into account the at least one sensor signal of the at least one surroundings detection sensor and/or the at least one vehicle state detection sensor, whether an emergency braking situation is present. The response of the method to the presence of an emergency braking situation is discussed below.

At least when no emergency braking situation is present and it is ascertained that the vehicle at that moment is traveling through a particulate matter protection area, a method step S2 for automatically braking the vehicle is carried out. For this purpose, during method step S2 (i.e., during the automatic braking) the brake force that is effectuated on the at least one associated wheel with the aid of the at least one friction brake is increased at most with a predefined or set limiting brake force buildup gradient that is less than the maximum brake force buildup gradient, and/or at most up to a predefined or set limiting brake force that is less than the maximum brake force. For example, during method step S2 (i.e., during the automatic braking) at least one braking system component of a braking system of the vehicle is controlled/operated in such a way that an effectuated brake force buildup gradient by which the brake force is increased during the automatic braking does not exceed the predefined or set limiting brake force buildup gradient, and/or the brake force that is effectuated during the automatic braking is at most equal to the predefined or set limiting brake force.

The method described here thus takes into account that typical particulate emissions are often to be attributed to abrasion of friction components during heavy and/or rapid braking. Particulate emissions may be prevented/reduced by limiting the force buildup gradient that is implemented during method step S2 to at most the limiting pressure buildup gradient and/or by limiting the brake force that is effectuated during method step S2 to at most the limiting brake force (due to a limited contact pressure of a friction material against its friction surface). Such prevention of abrasion is particularly desirable in particulate matter protection areas such as environmental zones, urban areas, and city centers. The method described here thus contributes significantly to improvements in living conditions and environmental conditions.

The at least one friction brake may be understood to mean at least one hydraulic friction brake and/or at least one electromechanical friction brake. When hydraulic friction brakes are used, the brake force that is effectuated on the at least one associated wheel with the aid of the at least one hydraulic friction brake corresponds to a brake pressure that is present/built up in the at least one hydraulic friction brake. Similarly, a brake force buildup gradient by which the brake force that is effectuated with the aid of the at least one hydraulic friction brake is increased corresponds to a pressure buildup gradient by which the brake pressure that is present/built up in the at least one hydraulic friction brake is increased. The maximum brake force buildup gradient, the limiting brake force buildup gradient, the maximum brake force, and the limiting brake force thus correspond to a maximum pressure buildup gradient, a limiting pressure buildup gradient, a maximum brake pressure, and a limiting brake pressure, respectively. If method step S2 is carried out using hydraulic friction brakes, the brake pressure that is present/built up in the at least one hydraulic friction brake is increased at most by a predefined or set limiting pressure buildup gradient that is less than the maximum pressure buildup gradient, and/or at most up to a predefined or set limiting brake pressure that is less than the maximum brake pressure.

In the specific embodiment described here, prior to method step S2 an optional method step S3 is carried out in which an electronic device for controlling the at least one braking system component of the braking system of the vehicle is switched to a braking or driving strategy that is optimized for particulate emissions. Prior to method step S2 (possibly without method step S3), a method step S4 may optionally be carried out in which the limiting brake force buildup gradient and/or the limiting brake force are/is set, taking into account at least one (ascertained/instantaneous) temperature of at least one friction component that is used for effectuating the automatic braking of the vehicle. For example, the limiting brake force buildup gradient and/or the limiting brake force may be set taking into account an (ascertained/instantaneous) brake disk temperature and/or an (ascertained/instantaneous) brake lining temperature. Alternatively or additionally, at least one (ascertained/instantaneous) temperature of at least one (further) friction component that is used for effectuating the automatic braking of the vehicle may be (additionally) taken into account in setting the limiting brake force buildup gradient and/or the limiting brake force. (Similarly, the limiting pressure buildup gradient and/or the limiting brake pressure may also be set in method step S4, taking into account the at least one (ascertained/instantaneous) temperature of the at least one friction component used, for example the (ascertained/instantaneous) brake disk temperature and/or the (ascertained/instantaneous) brake lining temperature.)

The method described here may also be enhanced in such a way that it is optimized for electric vehicles and hybrid vehicles. An electric vehicle or hybrid vehicle generally includes a generator (or an electric motor that is usable as a generator), for example the vehicle's electric drive motor. The generator is usually less critical to particulate emissions than the at least one friction brake of the vehicle. This may be utilized for reducing/avoiding undesirable particulate emissions. For this purpose, the maximum generator brake force that may be effectuated with the aid of the generator of the vehicle is ascertained (in method step S3, for example).

At least if the automatic braking of the vehicle is effectuatable within a predefined or set maximum time interval (solely) with the aid of the maximum generator brake force, a method step S5 is then carried out in which the vehicle is braked (solely) with the aid of the generator. If the maximum generator brake force is not sufficient for effectuating the automatic braking of the vehicle within the maximum time interval, method steps S2 and S5 may also be carried out together/simultaneously in order to brake the vehicle with the aid of the generator and with the aid of the at least one friction brake. In this case, it is advantageous when the available maximum generator brake force is completely utilized for automatically braking the vehicle, and the at least one friction brake is used solely for replacing a "lacking braking effect" of the generator for (completely) effectuating the automatic braking of the vehicle within the maximum time interval, the brake force that is effectuated on the at least one associated wheel with the aid of the at least one friction brake being increased at most by the limiting brake force buildup gradient and/or at most up to the limiting brake force. In other words, in a particulate matter protection area the generator is operated in a master mode, while the at least one friction brake is present in the slave mode.

The method described here may also be enhanced to provide a method for automatically controlling a speed of a vehicle. In this case, during a travel of the vehicle through a particulate matter protection area, an anticipatory driving strategy may also be carried out with the aid of an (optional) method step S6 in such a way that vehicle braking that is heavy or that generates particulates is avoided when the vehicle is traveling through the particulate matter protection area. For example, a (subsequent) acceleration of the previously automatically braked vehicle during its travel through the particulate matter protection area may be limited to a limiting acceleration and/or up to a limiting speed. It may thus be ensured that vehicle braking that is heavy or that generates particulates rarely occurs when the vehicle is traveling through the particulate matter protection area. (Subsequent) particulate emissions may thus be prevented in an anticipatory manner.

If it is determined in method step S1 that the vehicle at a given moment is not traveling through a particulate matter protection area, for example because the vehicle at that moment is traveling through a nonprotected area for particulate matter, a method step S7 for automatically braking the vehicle is carried out. When the brake force that is effectuated on the at least one associated wheel with the aid of the at least one friction brake is increased, no limiting of the brake force buildup gradient (below the maximum brake force buildup gradient) and no limiting of the maximum effectuated brake force (below the maximum brake force) is maintained during method step S7 (i.e., during the automatic braking). Instead, the brake force itself, which is effectuated on the at least one associated wheel, may be increased by the maximum brake force buildup gradient and/or up to the maximum brake force. The automatic braking of the vehicle is preferably achieved by brief and/or heavy braking in method step S7.

In addition, for an emergency braking situation that is determined in method step S0, method step S7 for automatically braking the vehicle may be carried out, even if the vehicle at that moment is traveling through a particulate matter protection area. The brake force that is effectuated on the at least one associated wheel with the aid of the at least one friction brake is then preferably increased by the maximum brake force buildup gradient and/or to the maximum brake force. In the event of an emergency braking situation, the particulate optimization is thus secondary, and the vehicle may be braked/brought to a standstill within a short period of time. The method described here thus achieves a high safety standard for the vehicle braked in this way.

Prior to method step S7, an (optional) method step S8 may be carried out in which the electronic device for controlling the at least one braking system component of the braking system of the vehicle is switched to a sporty braking or driving strategy. The sporty braking or driving strategy may also be understood to mean, for example, a fuel consumption-optimized driving strategy and/or a low CO2 emission driving strategy.

The method described above allows a situation-dependent braking strategy (and possibly a driving strategy) in order to selectively use the at least one friction brake with reduced particulate emissions or for achieving a sporty driving mode in different surroundings. Depending on the recognized surroundings, a braking strategy (or possibly a driving strategy) that is optimized for the surroundings is automatically selected. It is taken into account that longer but less intensive braking operations are optimized for particulates, while brief but intensive braking operations are preferred for a sporty driving mode.

Figure 2:
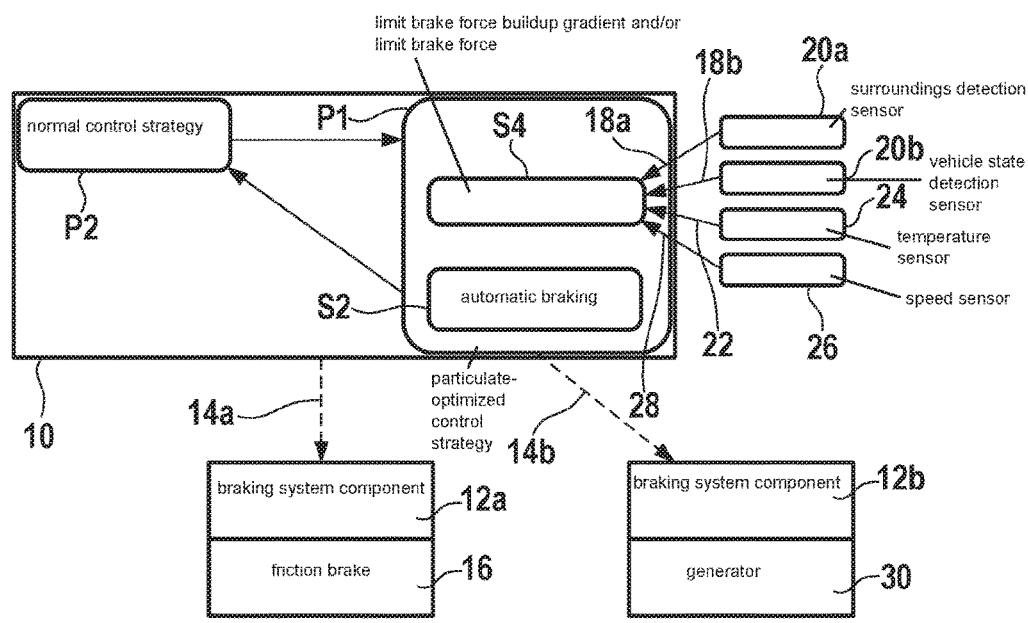
FIG. 2 shows a schematic illustration of one specific embodiment of the example automatic braking device according to the present invention.

FIG. 2 shows a schematic illustration of one specific embodiment of the automatic braking device.

The automatic braking device schematically depicted in FIG. 2 may also be referred to as automatic braking or as a braking assistant. With the aid of the automatic braking device, a vehicle may be slowed down and also brought to a standstill without a braking request from its driver. The vehicle may be understood in particular to mean a motor vehicle; usability of the automatic braking device is not limited to any one type of vehicle/motor vehicle. The automatic braking device may also be part of an automatic speed control system or may be designed as an automatic speed control system. The automatic speed control system may be understood in particular to mean a driving assistance system, for example an (automated) adaptive cruise control (ACC) system.

The automatic braking device includes an electronic device 10 that is designed to control at least one braking system component 12a and 12b of a braking system of the vehicle with the aid of at least one control signal 14a and 14b in such a way that the vehicle is brakable with the aid of a brake force that is effectuated on at least one associated wheel (not illustrated) of the vehicle with the aid of at least one friction brake 16 of the vehicle. The brake force that is effectuated on the at least one associated wheel with the aid of the at least one friction brake 16 is increased, at least at times, by a predefined maximum brake force buildup gradient and/or to a predefined maximum brake force. The maximum brake force buildup gradient and the maximum brake force may be predefined by technical means or by programming.

For example, electronic device 10 is designed to automatically/independently recognize, based on at least one sensor signal 18a and 18b of at least one surroundings detection sensor 20a and/or at least one vehicle state detection sensor 20b, whether automatic braking of the vehicle is advantageous. In addition, presence of an emergency braking situation may be determinable/recognizable with the aid of electronic device 10, taking into account the at least one sensor signal 18a and 18b.

At least when no emergency braking situation is present, electronic device 10 is designed, prior to outputting the at least one control signal 14a and 14b, to ascertain whether the vehicle at that moment is traveling through a particulate matter protection area specified for electronic device 10. The recognition of instantaneous travel of the vehicle through a particulate matter protection area may take place, for example, by evaluating the at least one sensor signal 18a of the at least one surroundings detection sensor 20a. Optionally, if the vehicle at that moment is traveling through a particulate matter protection area, electronic device 10 is designed to control the at least one braking system component 12a and 12b in such a way that the brake force that is effectuated on the at least one associated wheel with the aid of the at least one friction brake 16 is increased at most with a predefined or set limiting brake force buildup gradient that is less than the maximum brake force buildup gradient, and/or at most to a predefined or set limiting brake force that is less than the maximum brake force. The automatic braking device thus also implements a particulate-optimized braking or driving strategy while the vehicle is traveling through the particulate matter protection area, for example by switching electronic device 10 to a particulate-optimized control strategy P1.

As a refinement, electronic device 10 may additionally be designed to set the limiting brake force buildup gradient and/or the limiting brake force, taking into account at least one (ascertained/instantaneous) temperature, for example an instantaneous brake disk temperature and/or an instantaneous brake lining temperature, of at least one friction component that is used to effectuate the automatic braking of the vehicle. (Electronic device 10 may thus be designed to at least carry out method steps S2 and S4 described above.) The at least one (ascertained/instantaneous) temperature may be provided to electronic device 10 with the aid of at least one temperature signal 22 of at least one temperature sensor 24. In addition, an (instantaneous) vehicle speed may be measured with the aid of a speed sensor 26 and provided as a speed signal 28 to electronic device 10.

As another optional refinement, if the vehicle at that moment is traveling through a particulate matter protection area specified for electronic device 10, and at least when no emergency braking situation is present, the electronic device may additionally be designed to ascertain the maximum generator brake force that is effectuatable with the aid of a generator 30 of the vehicle, and, at least if the vehicle is brakable (solely) with the aid of the maximum generator brake force within a predefined or set maximum time interval, electronic device 10 may additionally be designed to control a generator control device 12b (as the at least one braking system component 12a and 12b) in such a way that the vehicle is braked with the aid of generator 30. With the aid of a preferred use of generator 30 for automatically braking the vehicle, it may also be ensured that as little particulate matter as possible is emitted by the at least one friction brake 16.

However, if electronic device 10 recognizes that the vehicle at that moment is not traveling through a particulate matter protection area, electronic device 10 is designed to not maintain limiting of the brake force buildup gradient (below the maximum brake force buildup gradient) and to not maintain limiting of the maximal effectuated brake force (below the maximum brake force) during control of the at least one braking system component 12a and 12b. Also, if electronic device 10 determines that an emergency braking situation is present, electronic device 10 may be designed to control the at least one braking system component 12a and 12b without limiting the brake force buildup gradient (below the maximum brake force buildup gradient) and without limiting the maximum effectuated brake force (below the maximum brake force), even if the vehicle at that moment is traveling through a particulate matter protection area that is specified for electronic device 10. For example, after determining that an emergency braking situation is present, electronic device 10 controls the at least one braking system component 12a and 12b in such a way that the brake force that is effectuated on the at least one associated wheel with the aid of the at least one friction brake 16 is increased by the maximum brake force buildup gradient and/or to the maximum brake force. For effectuating a sporty braking or driving strategy in a nonprotected area for particulate matter and/or when an emergency braking situation is present, electronic device 10 may be switched to a normal control strategy P2.

The at least one friction brake 16 may be understood to mean at least one hydraulic friction brake 16 and/or at least one electromechanical friction brake 16. As an advantageous addition, the at least one friction brake 16 may also be designed with an (organic or metallic) friction material that is optimized with respect to relatively low abrasion. The at least one braking system component 12a and 12b may be, for example, a control unit 12a of an electromechanical friction brake 16, a hydraulic device 12a that cooperates with the at least one hydraulic friction brake 16, and/or generator control device 12b.

What is claimed is:

1. An automatic braking device for a vehicle, comprising:
    an electronic device configured to control at least one braking system component of a braking system of the vehicle using at least one control signal in such a way that the vehicle is brakable using a brake force that is effectuated on at least one associated wheel of the vehicle using at least one friction brake of the vehicle, the brake force that is effectuated on the at least one associated wheel using the at least one friction brake being increased, at least at times, by a predefined maximum brake force buildup gradient and/or to a predefined maximum brake force;
    wherein the electronic device, at least when no emergency braking situation is present, is configured to, prior to outputting the at least one control signal, ascertain whether the vehicle at that moment is traveling through a particulate matter protection area specified for the electronic device, and if necessary, to control the at least one braking system component in such a way that the brake force that is effectuated on the at least one associated wheel using the at least one friction brake is increased: (i) at most with a predefined or set limiting brake force buildup gradient that is less than the maximum brake force buildup gradient, and/or (ii) at most to a predefined or set limiting brake force that is less than the maximum brake force.

2. The automatic braking device as recited in claim 1, wherein the electronic device is additionally configured to determine, taking into account at least one sensor of at least one surroundings detection sensor and/or at least one vehicle state detection sensor, whether an emergency braking situation is present, and if necessary, even if the vehicle at that moment is traveling through a particulate matter protection area that is specified for the electronic device, to control the at least one braking system component in such a way that the brake force that is effectuated on the at least one associated wheel using the at least one friction brake is increased by the maximum brake force buildup gradient and/or to the maximum brake force.

3. The automatic braking device as recited in claim 1, wherein the electronic device is additionally configured to set the limiting brake force buildup gradient and/or the limiting brake force, taking into account at least one temperature of at least one friction component that is used to effectuate an automatic braking of the vehicle.

4. The automatic braking device as recited in claim 1, wherein if the vehicle at that moment is traveling through a particulate matter protection area that is specified for the electronic device and no emergency braking situation is present, the electronic device is additionally configured to ascertain a maximum generator brake force that is effectuatable with using a generator of the vehicle, and if the vehicle is brakable within a predefined or set maximum time interval using the maximum generator brake force, to control a generator control device, as the at least one braking system component, in such a way that the vehicle is braked using the generator.

5. An automatic speed control system for a vehicle, comprising:
    an automatic braking device, including:
        an electronic device configured to control at least one braking system component of a braking system of the vehicle using at least one control signal in such a way that the vehicle is brakable using a brake force that is effectuated on at least one associated wheel of the vehicle using at least one friction brake of the vehicle, the brake force that is effectuated on the at least one associated wheel using the at least one friction brake being increased, at least at times, by a predefined maximum brake force buildup gradient and/or to a predefined maximum brake force;
        wherein the electronic device, at least when no emergency braking situation is present, is configured to, prior to outputting the at least one control signal, ascertain whether the vehicle at that moment is traveling through a particulate matter protection area specified for the electronic device, and if necessary, to control the at least one braking system component in such a way that the brake force that is effectuated on the at least one associated wheel using the at least one friction brake is increased: (i) at most with a predefined or set limiting brake force buildup gradient that is less than the maximum brake force buildup gradient, and/or (ii) at most to a predefined or set limiting brake force that is less than the maximum brake force.

6. A method for automatically braking a vehicle, comprising the following steps:
    automatically braking the vehicle using at least one friction brake of the vehicle in such a way that the vehicle is braked using a brake force that is effectuated on at least one associated wheel of the vehicle by the at least one friction brake, the brake force that is effectuated on the at least one associated wheel using the at least one friction brake being increased, at least at times, with a predefined maximum brake force buildup gradient and/or up to a predefined maximum brake force; and
    prior to the automatic braking step, at least when no emergency braking situation is present:
        ascertaining whether the vehicle at that moment is traveling through a specified or self-determined particulate matter protection area; and
        when it is ascertained that the vehicle at that moment is traveling through a particulate matter protection area, during the automatic braking the brake force that is effectuated on the at least one associated wheel using the at least one friction brake is increased: (i) at most with a predefined or set limiting brake force buildup gradient that is less than the maximum brake force buildup gradient, and/or (ii) at most up to a predefined or set limiting brake force that is less than the maximum brake force.

7. The method as recited in claim 6, further comprising the following step:

prior to the automatic braking, determining, taking into account at least one sensor signal of at least one surroundings detection sensor and/or at least one vehicle state detection sensor, whether an emergency braking situation is present, and when an emergency braking situation is determined, even when the vehicle at that moment is traveling through a particulate matter protection area, the brake force that is effectuated on the at least one associated wheel using the at least one friction brake is increased by the maximum brake force buildup gradient and/or to the maximum brake force.

8. The method as recited in claim 6, wherein the limiting brake force buildup gradient and/or the limiting brake force are/is set, taking into account at least one temperature of at least one friction component that is used to effectuate the automatic braking of the vehicle.

9. The method as recited in claim 6, wherein when the vehicle at that moment is traveling through a particulate matter protection area and at least when no emergency braking situation is present, a maximum generator brake force that is effectuatable using a generator of the vehicle is ascertained and, at least when the automatic braking of the vehicle is effectuatable using the maximum generator brake force within a predefined or set maximum time interval, the vehicle is braked using the generator.

10. A method for automatically controlling a speed of a vehicle, comprising the following step:

reducing a speed of the vehicle by automatically braking the vehicle according to a method of automatic braking, the method including the following steps:

automatically braking the vehicle using at least one friction brake of the vehicle in such a way that the vehicle is braked using a brake force that is effectuated on at least one associated wheel of the vehicle by the at least one friction brake, the brake force that is effectuated on the at least one associated wheel using the at least one friction brake being increased, at least at times, with a predefined maximum brake force buildup gradient and/or up to a predefined maximum brake force; and prior to the automatic braking step, at least when no emergency braking situation is present:

ascertaining whether the vehicle at that moment is traveling through a specified or self-determined particulate matter protection area; and when it is ascertained that the vehicle at that moment is traveling through a particulate matter protection area, during the automatic braking the brake force that is effectuated on the at least one associated wheel using the at least one friction brake is increased: (i) at most with a predefined or set limiting brake force buildup gradient that is less than the maximum brake force buildup gradient, and/or (ii) at most up to a predefined or set limiting brake force that is less than the maximum brake force.

* * * * *